United States Patent
Sato et al.

(10) Patent No.: US 10,001,562 B2
(45) Date of Patent: Jun. 19, 2018

(54) DISTANCE-SETTABLE PHOTOELECTRIC SENSOR

(71) Applicant: AZBIL CORPORATION, Chiyoda-ku (JP)

(72) Inventors: Nagayuki Sato, Chiyoda-ku (JP); Shinichiro Suzuki, Chiyoda-ku (JP); Tetsuo Koike, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 0 days. days.

(21) Appl. No.: 15/285,540

(22) Filed: Oct. 5, 2016

(65) Prior Publication Data

US 2017/0097418 A1    Apr. 6, 2017

(30) Foreign Application Priority Data

Oct. 6, 2015 (JP) .................................. 2015-198466

(51) Int. Cl.
   *G01S 17/08*    (2006.01)
   *G01S 17/02*    (2006.01)
   *G01S 17/48*    (2006.01)
   *G01S 7/481*    (2006.01)

(52) U.S. Cl.
   CPC ............. *G01S 17/08* (2013.01); *G01S 7/4813* (2013.01); *G01S 7/4816* (2013.01); *G01S 17/026* (2013.01); *G01S 17/48* (2013.01)

(58) Field of Classification Search
   CPC .......... G01S 17/08; G01S 17/48; G01S 17/46; G01S 17/06; G01S 17/026; G01S 7/4813; G01S 7/4816; G01S 7/481
   See application file for complete search history.

(56) References Cited

U.S. PATENT DOCUMENTS

| | | | | |
|---|---|---|---|---|
| 4,450,547 A | * | 5/1984 | Nakamura | G02B 27/40 250/201.5 |
| 5,138,150 A | * | 8/1992 | Duncan | G01S 7/4814 250/221 |
| 9,153,727 B2 | * | 10/2015 | Halbritter | G01S 7/4813 |
| 9,354,111 B2 | * | 5/2016 | Kerness | G01J 1/0271 |
| 2003/0123044 A1 | * | 7/2003 | Oka | G01C 3/08 356/3.02 |

(Continued)

FOREIGN PATENT DOCUMENTS

| JP | 8-255536 A | 10/1996 |
|---|---|---|
| JP | 2010-256182 | 11/2010 |

(Continued)

OTHER PUBLICATIONS

Extended European Search Report dated Feb. 23, 2017 in Patent Application No. 16192519.3.

*Primary Examiner* — John Lee
(74) *Attorney, Agent, or Firm* — Oblon, McClelland, Maier & Neustadt, L.L.P.

(57) ABSTRACT

A light receiver has a shield wall disposed facing a part of a near-side light-receiving face of a light receiving element from an end opposite from a far-side light-receiving face. The shield wall blocks a portion of reflection light from a detection object located at a distance at which the detection object reflects reflection light that causes an amount of light received by the light receiving element to be larger than or equal to a predetermined value.

3 Claims, 7 Drawing Sheets

(56) References Cited

U.S. PATENT DOCUMENTS

| | | | |
|---|---|---|---|
| 2006/0076523 A1* | 4/2006 | Higashiisogawa | G01N 21/4738 250/559.11 |
| 2007/0076843 A1* | 4/2007 | Matsumoto | G03F 1/22 378/34 |
| 2008/0049210 A1 | 2/2008 | Takaoka | |
| 2012/0295665 A1* | 11/2012 | Pantfoerder | G01J 1/0407 455/566 |
| 2013/0003039 A1* | 1/2013 | Wada | G01C 3/085 356/4.01 |
| 2014/0084307 A1 | 3/2014 | Halbritter | |
| 2014/0340892 A1* | 11/2014 | Knox | G01N 21/53 362/231 |
| 2015/0090909 A1* | 4/2015 | Shih | G01J 1/0266 250/578.1 |
| 2015/0259890 A1* | 9/2015 | Shirai | E03C 1/057 4/668 |
| 2015/0299992 A1* | 10/2015 | Shirai | G01S 17/48 4/668 |
| 2015/0301176 A1 | 10/2015 | Halbritter | |
| 2016/0238631 A1* | 8/2016 | Aharoni | G01Q 20/02 |
| 2017/0097418 A1* | 4/2017 | Sato | G01S 17/08 |
| 2017/0108582 A1* | 4/2017 | Takamiya | G01S 7/4814 |

FOREIGN PATENT DOCUMENTS

| | | |
|---|---|---|
| JP | 2011-43433 A | 3/2011 |
| JP | 2013-195079 A | 9/2013 |
| JP | 10 2012 107 794 A1 | 2/2014 |

* cited by examiner

DISTANCE-SETTABLE PHOTOELECTRIC SENSOR

CROSS-REFERENCE TO RELATED APPLICATIONS

This application claims the benefit of and priority to Japanese Patent Application No. 2015-198466, filed on Oct. 6, 2015, the entire contents of which are incorporated by reference herein.

BACKGROUND OF THE INVENTION

1. Field of the Invention

The present invention relates to distance-settable photoelectric sensors that can detect the presence or absence of detection objects located closer than set distances.

2. Description of the Related Art

A known distance-settable photoelectric sensor (background-suppression (BGS) photoelectric sensor) in the related art detects the presence or absence of a detection object located closer than a set distance (for example, see Japanese Unexamined Patent Application Publication No. 2010-256182). In this distance-settable photoelectric sensor, a light receiver is provided with a two-segment photodiode. By using the principle of triangulation, a detection object located closer than a set distance is detected by utilizing the fact that the light reception position at the two-segment photodiode varies depending on the distance to the detection object. For example, if there is a detection object located at the set distance, an equal amount of light is received at a near-side (N-side) light-receiving face and a far-side (F-side) light-receiving face of the two-segment photodiode due to reflection light from the detection object. If the detection object is closer to the distance-settable photoelectric sensor than the set distance, the N-side light-receiving face receives a larger amount of light due to reflection light from the detection object. In contrast, if the detection object is farther from the distance-settable photoelectric sensor than the set distance, the F-side light-receiving face receives a larger amount of light due to reflection light from the detection object. The distance-settable photoelectric sensor detects the difference between the amount of light received at the N-side and the amount of light received at the F-side and compares the difference with a threshold value so as to detect the detection object located closer than the set distance.

SUMMARY OF THE INVENTION

However, in the distance-settable photoelectric sensor in the related art, the amount of feedback light increases when the detection object is located close to the distance-settable photoelectric sensor, resulting in an increase in the amount of light received by the light receiving element. On the other hand, the light receiver has a dynamic range and if the amount of light received by the light receiver exceeds this range, a circuit in the light receiver becomes saturated. When the circuit in the light receiver is saturated, it becomes difficult to properly detect the difference between the amount of light received at the N-side light-receiving face and the amount of light received at the F-side light-receiving face, which is problematic in that malfunctions may occur.

As a countermeasure against saturation of the circuit in the light receiver caused by an increase in the amount of feedback light, for example, an automatic phase control (APC) circuit that automatically adjusts the amount of projection light in accordance with the amount of received light may be used, or the dynamic range of the light receiver may be increased. However, the countermeasure that uses an APC circuit is problematic in terms of a complex circuit and high costs. In the countermeasure that involves increasing the dynamic range, the dynamic range has to be expanded by increasing the voltage of the circuit in the light receiver or by reducing the sensitivity. This is problematic in that the detection distance becomes shorter and the circuit becomes complex.

The present invention has been made to solve the problems mentioned above, and an object thereof is to provide a distance-settable photoelectric sensor that can avoid malfunctions by preventing saturation of a circuit in a light receiver caused by an increase in the amount of feedback light.

A distance-settable photoelectric sensor according to the present invention has a light projector that projects light and a light receiver that has a light receiving element extending from a near-side light-receiving face to a far-side light-receiving face and that receives reflection light with respect to the light projected by the light projector. The distance-settable photoelectric sensor detects presence or absence of a detection object located closer than a set distance based on a light reception result obtained by the light receiver. The light receiver has a shield wall disposed facing a part of the near-side light-receiving face of the light receiving element from an end opposite from the far-side light-receiving face. The shield wall blocks a portion of reflection light from the detection object located at a distance at which the detection object reflects reflection light that causes an amount of light received by the light receiving element to be larger than or equal to a predetermined value.

With the above-described configuration according to the present invention, saturation of a circuit in a light receiver caused by an increase in the amount of feedback light is prevented so that malfunctions are avoided.

DESCRIPTION OF THE PREFERRED EMBODIMENT

An embodiment of the present invention will be described in detail below with reference to the drawings.

First Embodiment

Figure 1:
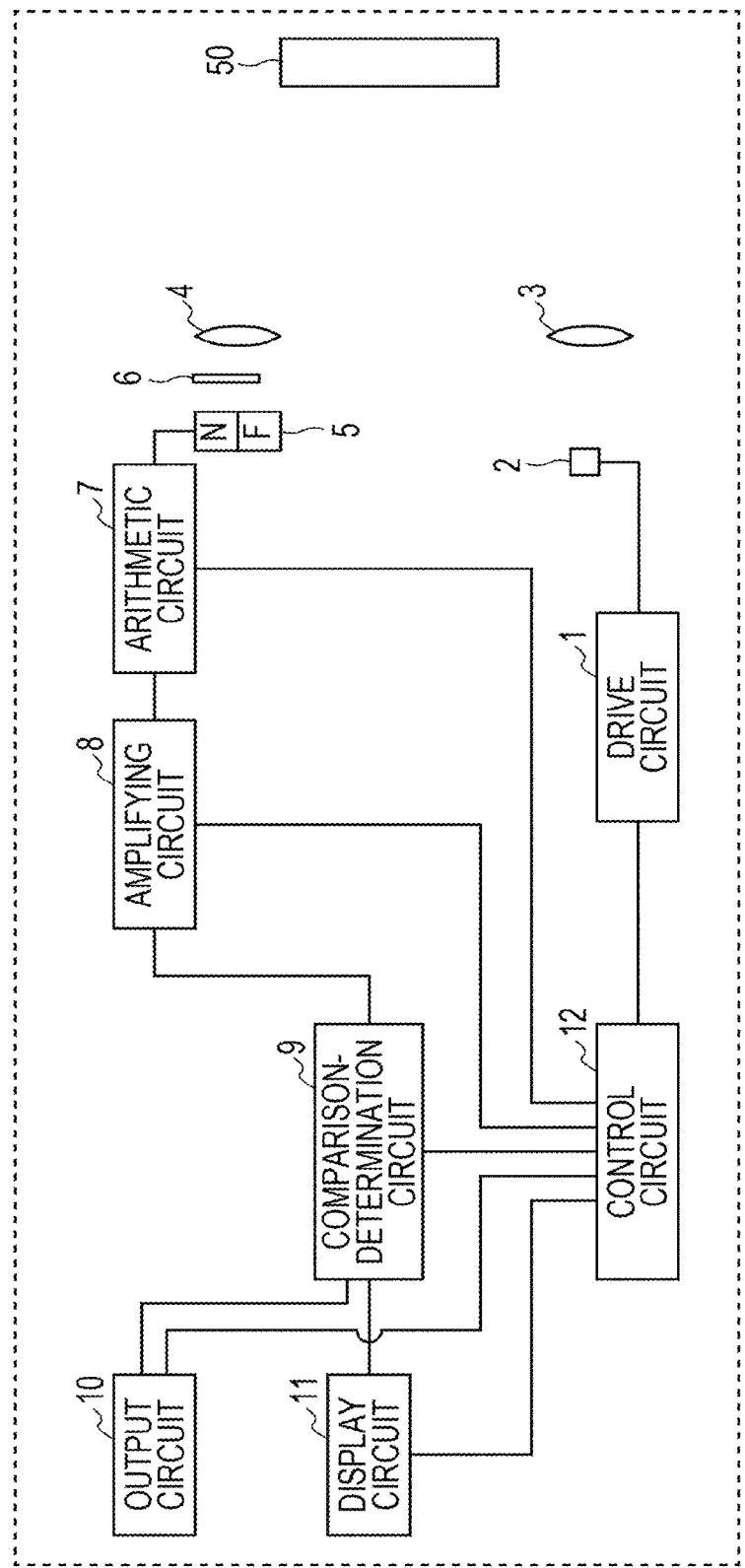
FIG. 1 illustrates a configuration example of a distance-settable photoelectric sensor according to a first embodiment of the present invention.

FIG. 1 illustrates a configuration example of a distance-settable photoelectric sensor according to a first embodiment of the present invention.

The distance-settable photoelectric sensor includes a light projector that projects light, and also includes a light receiver that has a light receiving element 5 extending from a near-side (N-side) light-receiving face to a far-side (F-side) light-receiving face and that receives reflection light with respect to the light projected by the light projector. Based on the light reception result obtained by the light receiver, the distance-settable photoelectric sensor detects the presence or absence of a detection object 50 located closer than a set distance.

As shown in FIG. 1, the photoelectric sensor includes a drive circuit 1, a light projecting element 2, a light-projection optical system 3, a light-reception optical system 4, the light receiving element 5, a shield wall 6, an arithmetic circuit 7, an amplifying circuit 8, a comparison-determination circuit 9, an output circuit 10, a display circuit 11, and a control circuit 12.

In the configuration shown in FIG. 1, the drive circuit 1, the light projecting element 2, and the light-projection optical system 3 constitute the light projector, and the light-reception optical system 4, the light receiving element 5, the shield wall 6, the arithmetic circuit 7, and the amplifying circuit 8 constitute the light receiver.

The drive circuit 1 generates electric current for the light projecting element 2.

The light projecting element 2 is driven by the electric current generated by the drive circuit 1 and emits light. An example of the light projecting element 2 used is a light emitting diode (LED).

The light-projection optical system 3 collects the light emitted by the light projecting element 2. The light collected by the light-projection optical system 3 is projected onto a detection region. Then, if there is a detection object 50 in the detection region, the light is reflected by this detection object 50.

The light-reception optical system 4 collects the light reflected by the detection object 50 located in the detection region.

The light receiving element 5 extends from the N-side light-receiving face to the F-side light-receiving face of the light receiver and converts the light collected by the light-reception optical system 4 into an electric signal (i.e., electric current). As the light receiving element 5, any one of a two-segment photodiode, a multi-segment photodiode, a position sensitive detector (PSD) (position detecting element), and a one-dimensional charge-coupled device (CCD) is used. With this light receiving element 5, the amount of light received at the N-side light-receiving face and the amount of light received at the F-side light-receiving face can be detected.

Figure 2:
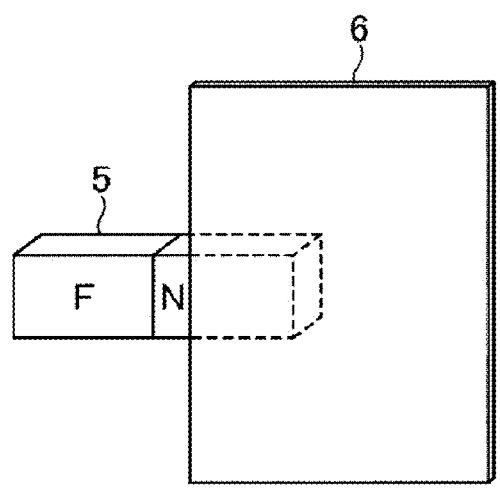
FIG. 2 is a perspective view illustrating a configuration example of a shield wall in the first embodiment of the present invention.

As shown in FIG. 2, the shield wall 6 is disposed facing a part of the N-side light-receiving face of the light receiving element 5 from the end opposite from the F-side light-receiving face. The shield wall 6 is disposed at a position where it blocks a portion of reflection light from the detection object 50 located at a distance at which it reflects reflection light that causes the amount of light received by the light receiving element 5 to be larger than or equal to a predetermined value. This shield wall 6 can prevent an increase in the amount of light received by the light receiver caused by an increase in the amount of feedback light, thereby avoiding saturation of the circuits in the light receiver.

The arithmetic circuit 7 detects a difference between the amount of light (i.e., electric current) received at the N-side light-receiving face and the amount of light (i.e., electric current) received at the F-side light-receiving face, which are detected by the light receiving element 5.

The amplifying circuit 8 converts the electric current processed by the arithmetic circuit 7 into a voltage and amplifies the voltage based on a predetermined amplification factor. The voltage amplified by the amplifying circuit 8 corresponds to a light reception signal.

The comparison-determination circuit 9 compares the voltage amplified by the amplifying circuit 8 with a criterion threshold value so as to detect the presence or absence of an object in the detection region. In this case, if the voltage amplified by the amplifying circuit 8 is larger than the criterion threshold value, the comparison-determination circuit 9 determines that there is no object in the detection region. If the voltage amplified by the amplifying circuit 8 is smaller than or equal to the criterion threshold value, the comparison-determination circuit 9 determines that there is an object in the detection region. For example, an up-down counter is used as the comparison-determination circuit 9.

The output circuit 10 outputs information indicating the determination result obtained by the comparison-determination circuit 9. In this case, the output circuit 10 actuates an output transistor based on the information indicating the determination result.

The display circuit 11 uses, for example, an indication light to display the information indicating the determination result obtained by the comparison-determination circuit 9.

The control circuit 12 controls the operation of each section of the photoelectric sensor.

Next, the effects of the distance-settable photoelectric sensor having the above-described configuration will be described.

Figure 3A:
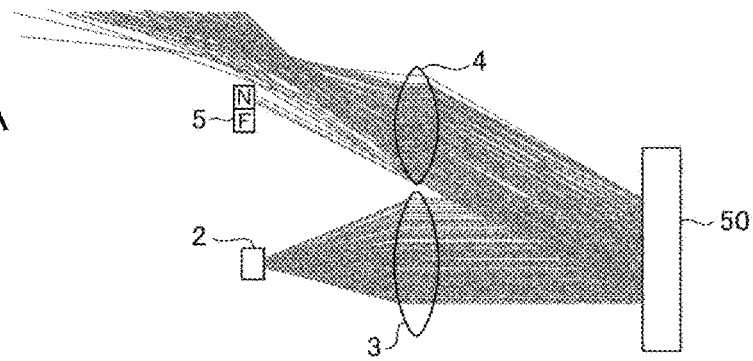
FIGS. 3A to 3C illustrate variations in the amount of received light depending on the position of a detection object in the configuration in the related art, FIG. 3A corresponding to a case where the distance to the detection object is about 20 mm, FIG. 3B corresponding to a case where the distance to the detection object is about 80 mm, FIG. 3C corresponding to a case where the distance to the detection object is about 450 mm.
Figure 3B:
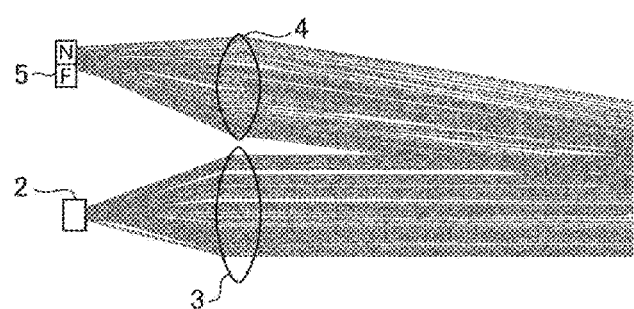
Figure 3C:
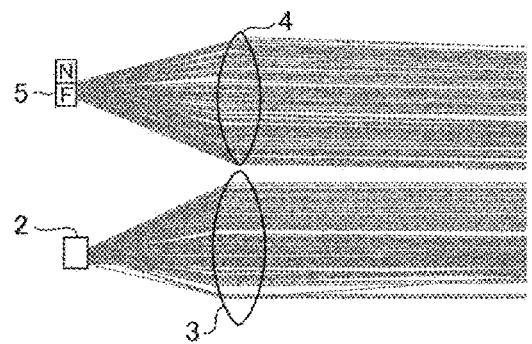

First, variations in the amount of received light depending on the position of the detection object 50 in the case of the configuration in the related art will be described with reference to FIGS. 3A to 3C. In FIGS. 3A to 3C, only the light projecting element 2, the light-projection optical system 3, the light-reception optical system 4, and the light receiving element 5 of the distance-settable photoelectric sensor are illustrated.

FIG. 3A illustrates a case where the detection object 50 is positioned extremely close to the distance-settable photoelectric sensor (i.e., the distance from the distance-settable photoelectric sensor is about 20 mm). In this case, although there is a large amount of feedback light, the reflection light is reflected at an angle toward the light receiving side so that a large portion of the reflection light from the detection object 50 deviates from the light receiving element 5, resulting in a small amount of light received by the light receiving element 5. Specifically, since the size of the light receiving element 5 is limited and small, the reflection light deviates from the light-receiving faces when the detection object 50 is positioned extremely close to the distance-settable photoelectric sensor.

FIG. 3B illustrates a case where the detection object 50 is positioned close to the distance-settable photoelectric sensor (i.e., the distance from the distance-settable photoelectric sensor is about 80 mm). In this case, there is a large amount of feedback light, and the amount of light received by the light receiving element 5 is at maximum. When the amount of light received by the light receiving element 5 increases as a result of an increase in the amount of feedback light in this manner, the circuits become saturated, resulting in malfunctions.

FIG. 3C illustrates a case where the detection object 50 is positioned far from the distance-settable photoelectric sensor (i.e., the distance from the distance-settable photoelectric sensor is about 450 mm). In this case, the reflection light becomes substantially collimated light so that there is a small amount of feedback light, resulting in a small amount of light received by the light receiving element 5.

Figure 4A:
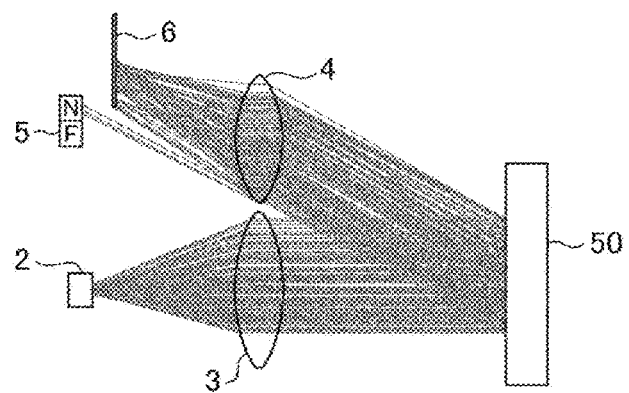
FIGS. 4A to 4C illustrate variations in the amount of received light depending on the position of the detection object in the distance-settable photoelectric sensor according to the first embodiment of the present invention, FIG. 4A corresponding to a case where the distance to the detection object is about 20 mm, FIG. 4B corresponding to a case where the distance to the detection object is about 80 mm, FIG. 4C corresponding to a case where the distance to the detection object is about 450 mm.

Next, variations in the amount of received light depending on the position of the detection object 50 in the case of the configuration according to the present invention will be described with reference to FIGS. 4A to 5. In FIGS. 4A to 4C, only the light projecting element 2, the light-projection optical system 3, the light-reception optical system 4, the light receiving element 5, and the shield wall 6 of the distance-settable photoelectric sensor are illustrated.

Figure 4B:
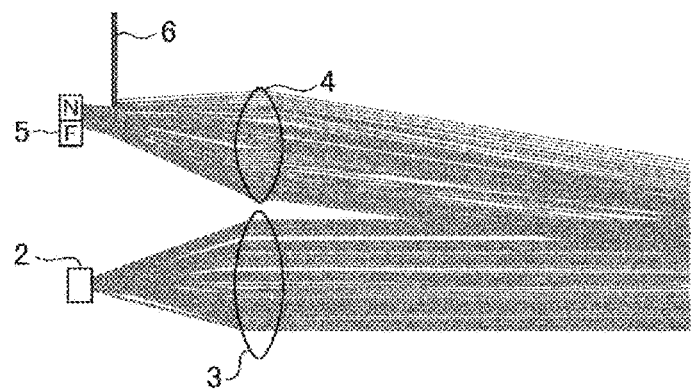
Figure 4C:
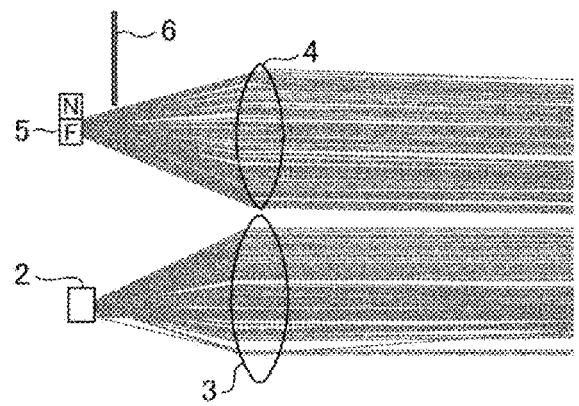
Figure 5:
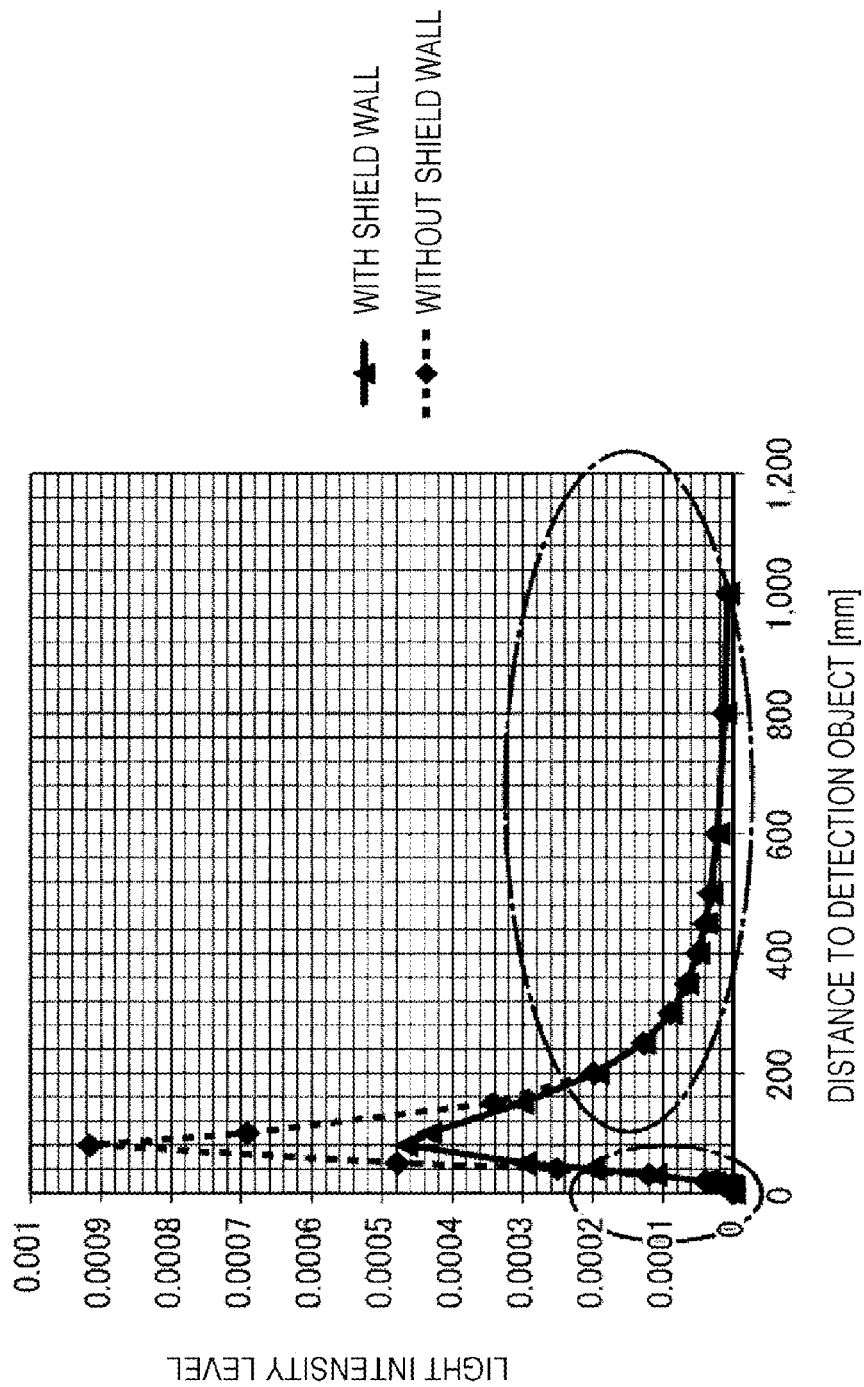
FIG. 5 illustrates the effects of the distance-settable photoelectric sensor according to the first embodiment of the present invention.

As shown in FIGS. 4A to 4C, the present invention is provided with the shield wall 6 that is disposed facing a part of the N-side light-receiving face of the light receiving element 5 from the end opposite from the F-side light-receiving face and that blocks a portion of reflection light from the detection object 50 located at a distance at which it reflects reflection light that causes the amount of light received by the light receiving element 5 to be larger than or equal to a predetermined value. As shown in FIG. 4B, with this shield wall 6, a portion of the reflection light is blocked in the case where the detection object 50 is close to the distance-settable photoelectric sensor (i.e., the distance from the distance-settable photoelectric sensor is about 80 mm), so that the amount of feedback light is reduced. As a result, the amount of light received by the light receiving element 5 can be reduced. In an example shown in FIG. 5, the amount of received light when the shield wall 6 is provided can be reduced by about 50%. In FIG. 5, a dashed line indicates a case where the shield wall 6 is not provided (i.e., the configuration in the related art), whereas a solid line indicates a case where the shield wall 6 is provided (i.e., the configuration according to the present invention).

Furthermore, as shown in FIGS. 4A and 4C, in a case where the detection object 50 is extremely close to the distance-settable photoelectric sensor and in a case where the detection object 50 is far from the distance-settable photoelectric sensor (i.e., the distances from the distance-settable photoelectric sensor are about 20 mm and 450 mm, respectively), the shield wall 6 does not block the reflection light. In the example shown in FIG. 5, it is clear that regions surrounded by single-dot chain lines are not affected by the shield wall 6.

Accordingly, in the present invention, the amount of received light can be reduced by blocking the reflection light only with respect to positions of the detection object 50 where the amount of feedback light increases, so that saturation of the light receiving element 5 can be avoided.

Figure 6A:
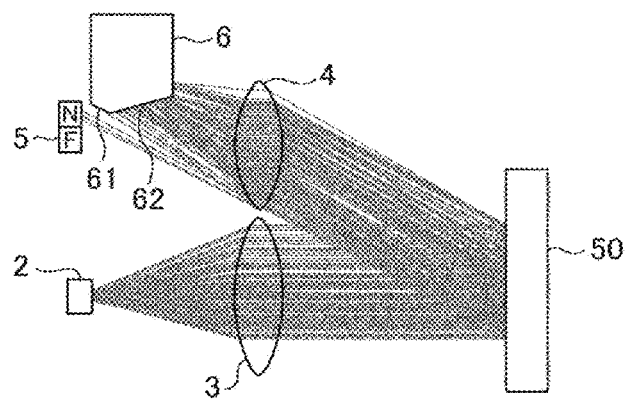
FIGS. 6A to 6C illustrate another configuration of the shield wall of the distance-settable photoelectric sensor according to the first embodiment of the present invention, FIG. 6A corresponding to a case where the distance to the detection object is about 20 mm, FIG. 6B corresponding to a case where the distance to the detection object is about 80 mm, FIG. 6C corresponding to a case where the distance to the detection object is about 450 mm.
Figure 6B:
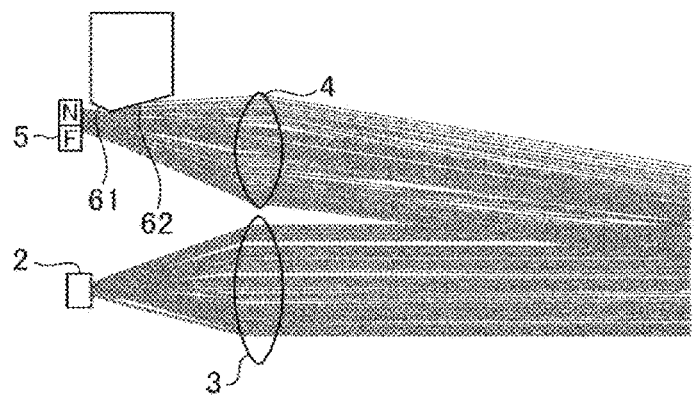
Figure 6C:
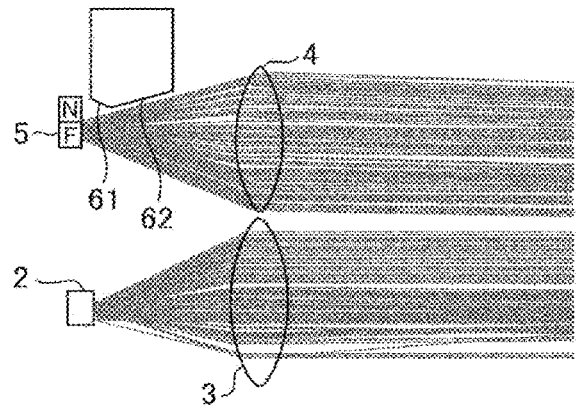

In actuality, it is difficult to provide an extremely thin member, as shown in FIGS. 4A to 4C, as the shield wall 6. Therefore, for example, as shown in FIGS. 6A to 6C, the shield wall 6 provided may be configured such that the side edge thereof that blocks the reflection light is sharply-angled. This side edge of the shield wall 6 has a first surface 61 and a second surface 62. The first surface 61 is given an angle such that it does not block reflection light that is to enter the light receiving element 5 from a detection object 50 located closer than a distance at which it reflects reflection light that causes the amount of received light to be larger than or equal to the predetermined value. The second surface 62 is given an angle such that it does not block reflection light that is to enter the light receiving element 5 from a detection object 50 located farther than the aforementioned distance. Specifically, in an example in FIG. 6A, the first surface 61 of the side edge is given an angle such that it does not block reflection light that is to enter the light receiving element 5 from a detection object 50 positioned at about 20 mm from the distance-settable photoelectric sensor. In an example in FIG. 6C, the second surface 62 of the side edge is given an angle such that it does not block reflection light that is to enter the light receiving element 5 from a detection object 50 positioned at about 450 mm from the distance-settable photoelectric sensor.

Accordingly, in the first embodiment, the light receiver is provided with the shield wall 6 that is disposed facing a part of the N-side light-receiving face of the light receiving element 5 from the end opposite from the F-side light-receiving face and that blocks a portion of reflection light from the detection object 50 located at a distance at which it reflects reflection light that causes the amount of light received by the light receiving element 5 to be larger than or equal to the predetermined value. Thus, saturation of the circuits in the light receiver caused by an increase in the amount of feedback light is prevented, thereby avoiding malfunctions. Furthermore, an increase in the amount of feedback light can be suppressed with a simple-structured member, without having to use a light receiver having an automatic phase control (APC) circuit and a high dynamic range as in the related art.

Figure 7A:
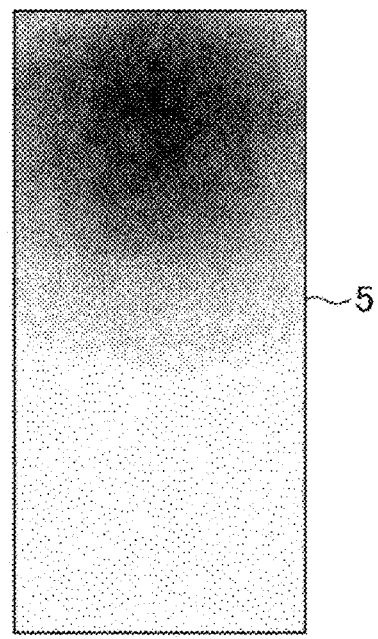
FIGS. 7A and 7B illustrate the secondary effects of the distance-settable photoelectric sensor according to the first embodiment of the present invention, FIG. 7A illustrating the spot diameter in a light receiving element in the configuration in the related art, FIG. 7B illustrating the spot diameter in a light receiving element in the configuration according to the present invention (i.e., in a case where the distance to the detection object is about 80 mm).
Figure 7B:
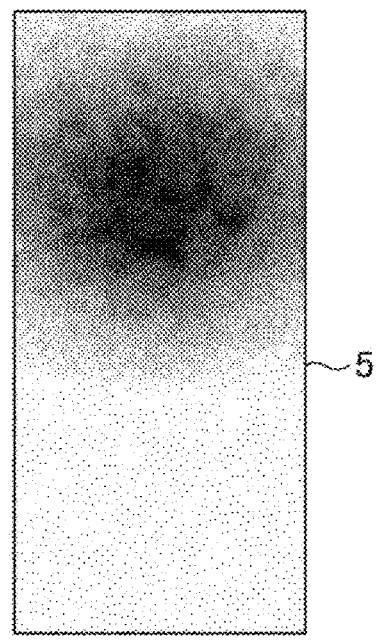

Furthermore, as shown in FIG. 7A, in the configuration in the related art, reflection light from a distance at which the amount of feedback light increases causes the image to blur in relation to the focal length, and the spot diameter on the light-receiving face of the light receiving element 5 increases. In contrast, by providing the shield wall 6 as in the present invention, blurriness can be reduced with respect to reflection light from a distance at which the amount of feedback light increases, and the spot diameter on the light-receiving face of the light receiving element 5 can be reduced, as shown in FIG. 7B. This allows for improved detection accuracy with regard to the amount of received light.

In the present invention, arbitrary components in the embodiment may be modified or omitted within the scope of the invention.

What is claimed is:

1. A distance-settable photoelectric sensor, comprising:
   a light projector configured to project light toward a detection object;
   a light reception optical system configured to collect reflection light reflected by the detection object with respect to the light projected by the light projector;
   a light receiving element configured to receive the reflection light collected by the light reception optical system, the distance-settable photoelectric sensor being configured to detect presence or absence of the detection object located closer than a set distance based on a light reception result obtained by the light receiving element; and
   a shield wall disposed between the light reception optical system and the light receiving element, the shield wall overlapping a first side of the light receiving element and not overlapping a second side of the light receiving element in a top view of the light receiving element, the second side being closer to the light projector than the first side, the shield wall blocking a portion of reflection light from the detection object located at a distance at which the detection object reflects reflection light that causes an amount of light received by the light receiving element to be larger than or equal to a predetermined value.

2. The distance-settable photoelectric sensor according to claim 1,
   wherein a side edge of the shield wall that blocks the reflection light is sharply-angled and has a first surface and a second surface, the side edge of the shield wall protruding toward a side of the light projector from a side of the light receiving element, the first surface being located closer to the light receiving element than the second surface, and the second surface being located closer to the light reception optical system than the first surface, the first surface being given an angle with respect to a plane of the light receiving element such that the first surface does not block reflection light that is to enter the light receiving element from the detection object located closer than the distance, the second surface being given an angle with respect to the plane of the light receiving element such that the second surface does not block reflection light that is to enter the light receiving element from the detection object located farther than the distance.

3. The distance-settable photoelectric sensor according to claim 1,
   wherein the light receiving element is any one of a two-segment photodiode, a multi-segment photodiode, a position detecting element, and a one-dimensional charge-coupled device.

* * * * *